(12) United States Patent
Kim et al.

(10) Patent No.: US 9,291,854 B2
(45) Date of Patent: Mar. 22, 2016

(54) BACKLIGHT ASSEMBLY AND DISPLAY APPARATUS HAVING THE SAME

(75) Inventors: Hyuk-Hwan Kim, Asan-si (KR); Si-Ki Park, Asan-si (KR); Young-Min Park, Seoul (KR); Hyun-Jeong Kim, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 58 days.

(21) Appl. No.: 13/592,155

(22) Filed: Aug. 22, 2012

(65) Prior Publication Data

US 2013/0049572 A1 Feb. 28, 2013

(30) Foreign Application Priority Data

Aug. 24, 2011 (KR) .................. 10-2011-0084735

(51) Int. Cl.
   *F21V 7/04* (2006.01)
   *G02F 1/1335* (2006.01)
   *F21V 8/00* (2006.01)

(52) U.S. Cl.
   CPC ........ *G02F 1/133615* (2013.01); *G02B 6/0023* (2013.01); *G02B 6/0073* (2013.01); *G02F 1/133617* (2013.01); *G02F 2001/133624* (2013.01)

(58) Field of Classification Search
   USPC .................................. 362/614, 621, 622, 627
   See application file for complete search history.

(56) References Cited

U.S. PATENT DOCUMENTS

| | | | |
|---|---|---|---|
| 7,887,206 B2 | 2/2011 | Lee | |
| 2003/0076669 A1* | 4/2003 | Itoh et al. | 362/31 |
| 2004/0042233 A1* | 3/2004 | Suzuki et al. | 362/561 |
| 2004/0100788 A1 | 5/2004 | Ju | |
| 2006/0077686 A1 | 4/2006 | Han et al. | |
| 2007/0274096 A1* | 11/2007 | Chew et al. | 362/609 |
| 2009/0046470 A1* | 2/2009 | Lai et al. | 362/311 |
| 2009/0129055 A1* | 5/2009 | Morizawa et al. | 362/97.1 |
| 2010/0038665 A1* | 2/2010 | Sugiura et al. | 257/98 |
| 2010/0053504 A1 | 3/2010 | Klim et al. | |
| 2011/0090670 A1* | 4/2011 | Ahn et al. | 362/84 |

FOREIGN PATENT DOCUMENTS

| | | |
|---|---|---|
| CN | 10-1369619 A | 2/2009 |
| CN | 20-1666514 U | 12/2010 |
| CN | 10-2086992 A | 6/2011 |
| JP | 2006-202533 A | 8/2006 |
| JP | 2010-192276 A | 9/2010 |
| KR | 1020070081970 A | 8/2007 |

* cited by examiner

*Primary Examiner* — Andrew Coughlin
(74) *Attorney, Agent, or Firm* — Innovation Counsel LLP (57) ABSTRACT

A backlight assembly includes a light emitting portion, a chromaticity converter and a light guide plate. The light emitting portion generates a first light. The chromaticity converter receives the first light, and converts a chromaticity of the first light to generate a uniform light having a uniform chromaticity. The light guide plate includes an incident surface to which the uniform light is incident, and a light exiting surface guiding the uniform light provided from the incident surface and emitting the uniform light. Accordingly, a display quality of a display apparatus may be enhanced.

13 Claims, 9 Drawing Sheets

BACKLIGHT ASSEMBLY AND DISPLAY APPARATUS HAVING THE SAME

CROSS REFERENCE TO RELATED APPLICATION

This application claims priority under 35 U.S.C. §119 to Korean Patent Application No. 10-2011-0084735, filed on Aug. 24, 2011 in the Korean Intellectual Property Office (KIPO), the contents of which are herein incorporated by reference in their entireties.

BACKGROUND

1. Field of the Invention

Example embodiments of the present invention relate to a backlight assembly and a method of manufacturing the backlight assembly. More particularly, example embodiments of the present invention relate to a backlight assembly having a light source and a method of manufacturing the backlight assembly.

2. Description of the Related Art

Light emitting diodes (LEDs) are widely used as a light sources in display apparatuses, such as, for example, liquid crystal display apparatus, electrophoretic display apparatus and micro electro mechanical system (MEMS) display apparatus, and so on. In the light sources, the LED may be disposed on a lead frame, and may be mounted on the printed circuit board (PCB) as an LED package.

Recently, to increase the intensity of the LED package, the length of the lead frame may be increased and/or a plurality of the light emitting diodes may be disposed on the lead frame. Increasing the length of the lead frame has the additional advantage of effectively dissipating heat generated from the light emitting diode.

However, the light generated from an LED package in which the length of the lead frame is increased several times larger than the length of the light emitting diode, does not have a normal chromaticity across the entire LED package. The light has normal chromaticity in an area adjacent to the LED, but has a decreased chromaticity in an area relatively spaced apart from the LED.

The variability in chromaticity may affect the display quality of a display apparatus. For example, when used in a light source, the light having the chromaticity that differs according to position is incident into a light guide plate, so that a quality of display apparatus may be deteriorated.

SUMMARY

A backlight assembly capable of enhancing a display quality is provided.

A method of manufacturing the backlight assembly is also provided.

According to one aspect, a backlight assembly includes a light emitting portion, a chromaticity converter and a light guide plate. The light emitting portion is configured to generate a first light. The chromaticity converter is configured to receive the first light, and convert a chromaticity of the first light to generate a uniform light having a uniform chromaticity. The light guide plate includes an incident surface into which the uniform light is incident and a light exiting surface through which the uniform light from the incident surface exits.

The chromaticity converter may be disposed on the incident surface of the light guide plate.

The light emitting portion may include a light emitting chip, a lead frame and a fluorescent portion. The light emitting chip may generate a second light. The light emitting chip may be mounted on the lead flame. The fluorescent portion may cover the light emitting chip and may be mixed with the second light from the light emitting chip to generate the first light.

The chromaticity converter may include a chromaticity converting material decreasing a chromaticity of the second light, and a concentration of the chromaticity converting material may increase toward a center of the light emitting chip.

A thickness of the chromaticity converter may be increased toward a center of the light emitting chip The chromaticity converter may decrease a chromaticity of the second light generated from the light emitting chip.

The first light may be a white light, the second light may be a blue light, and the fluorescent portion may include red and green fluorescent materials.

The chromaticity converter may include a yellow fluorescent material.

The chromaticity converter may include red and green fluorescent materials.

The chromaticity converter may include an epoxy resin.

The chromaticity converter may include titanium dioxide ($TiO_2$).

The chromaticity converter may include a chromaticity converting material and a resin paste. The chromaticity converting material may convert the chromaticity of the first light. The resin paste may be mixed with the chromaticity converting material.

The chromaticity converter may include a base film, a chromaticity converting material, a protecting layer and an adhesion layer. The chromaticity converting material may be disposed on a first surface of the base film, and may convert the chromaticity of the first light. The protecting layer may cover the chromaticity converting material to prevent the chromaticity converting material from being damaged. The adhesion layer may be disposed on a second surface opposite to the first surface, and may be attached to the incident surface of the light guide plate.

According to another aspect, a method of manufacturing a backlight assembly includes forming a chromaticity converter converting a chromaticity of a first light to generate a uniform light having a uniform chromaticity on a light guide plate, and disposing a light emitting portion generating the first light to face the chromaticity converter.

The chromaticity converter may be formed on the light guide plate by increasing a concentration of a chromaticity converting material converting a chromaticity of a second light toward a center of a light emitting chip being included in the light emitting portion and generating the second light.

The chromaticity converter may be formed on the light guide plate by increasing a thickness of the chromaticity converter toward a center of a light emitting chip being included in the light emitting portion and generating a second light.

Forming the chromaticity converter on the light guide plate may include forming a chromaticity converting material converting the chromaticity of the first light on a first surface of a base film, forming a protecting layer on the chromaticity converting material to prevent the chromaticity converting material from being damaged, and forming an adhesion layer on a second surface opposite to the first surface.

Forming the chromaticity converting material on the first surface of the base film may include transferring the chromaticity converting material from a surface of a roller to the first surface of the base film.

Forming the chromaticity converter on the light guide plate may include coating a chromaticity converting material converting the chromaticity of the first light on an incident of the light guide plate via a spray method.

The method may further include stacking a plurality of the light guide plates to make contact with each other, before coating the chromaticity converting material on the incident surface of the light guide plate, and separating the light guide plates from each other.

Even if the light has a chromaticity that varies depending on position is generated from a light emitting portion, the chromaticity of the light generated from the light emitting portion is converted, so that the light having a uniform chromaticity may be applied to a light guide plate. Accordingly, a display quality of a display apparatus may be enhanced.

BRIEF DESCRIPTION OF THE DRAWINGS

The above and other features and advantages will become more apparent by describing example embodiments thereof with reference to the accompanying drawings, in which:

FIG. 5A to FIG. 5F are cross-sectional views illustrating a method of manufacturing a backlight assembly shown in FIGS. 1 and 2;

DETAILED DESCRIPTION OF THE INVENTION

Hereinafter, example embodiments will be explained in detail with reference to the accompanying drawings.

Figure 1:
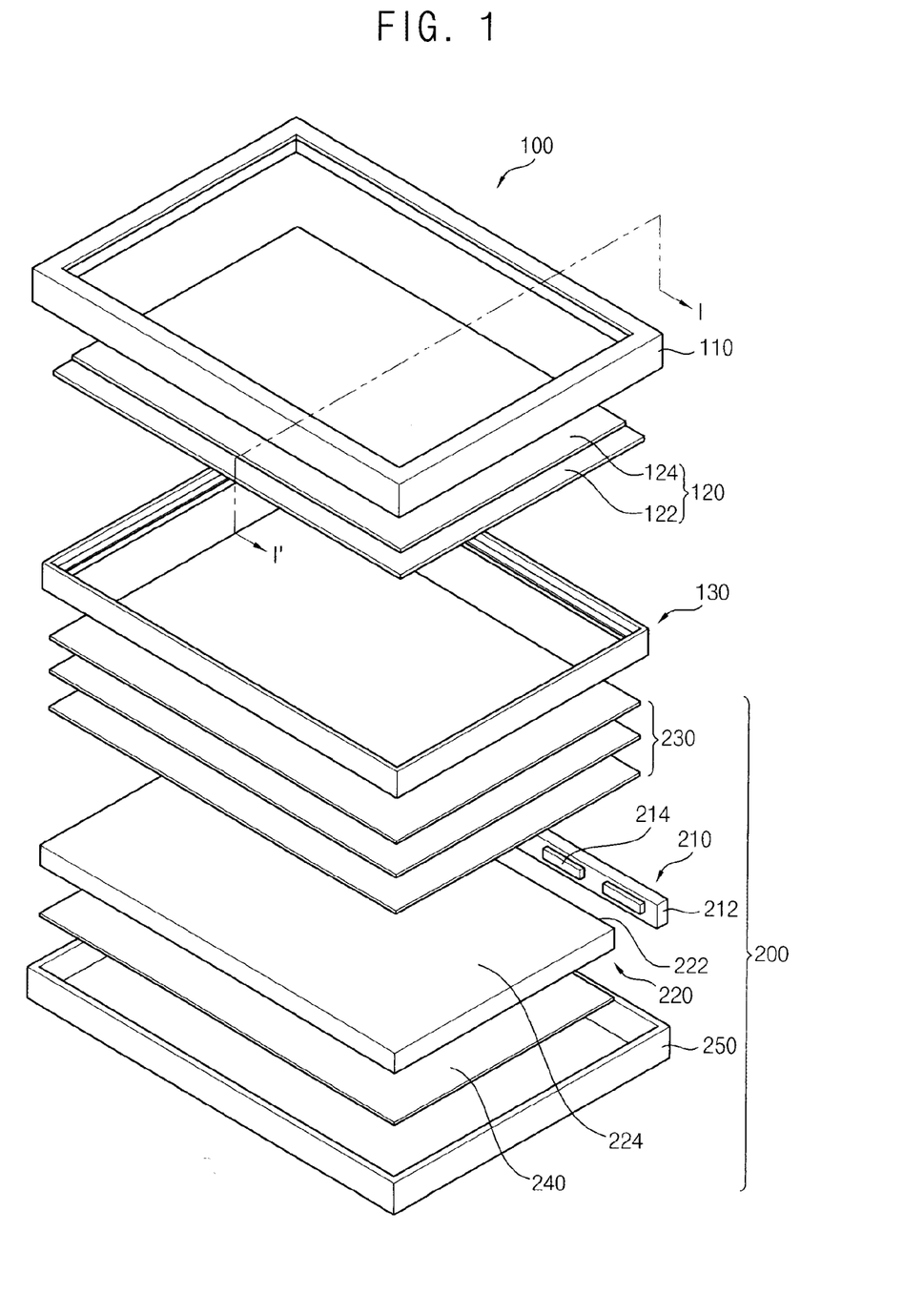
FIG. 1 is an exploded perspective view illustrating a display apparatus according to an example embodiment.
Figure 2:
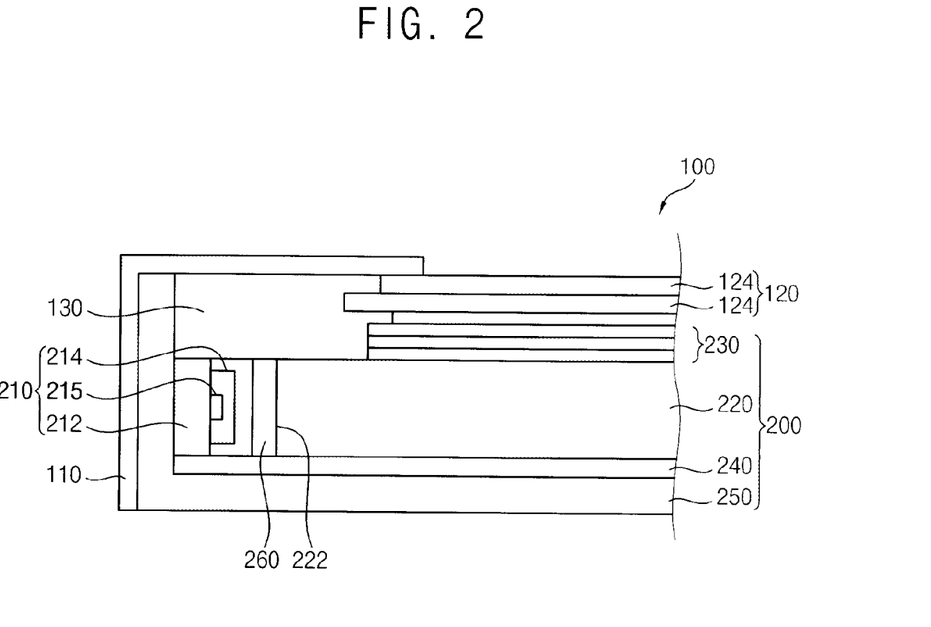
FIG. 2 is a cross-sectional view taken along a line I-I' of FIG. 1.
Figure 3:
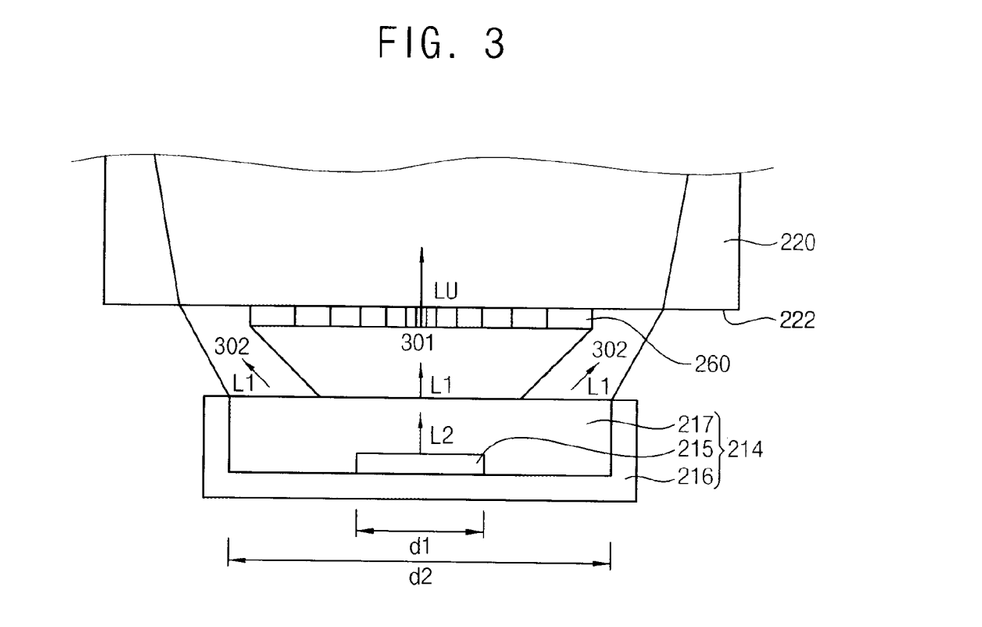
FIG. 3 is a plan view illustrating a light emitting package, a chromaticity converter and a light guide plate shown in FIG. 1.

FIG. 1 is an exploded perspective view illustrating a display apparatus according to an example embodiment. FIG. 2 is a cross-sectional view taken along a line I-I' of FIG. 1. FIG. 3 is a plan view illustrating a light emitting package, a chromaticity converter and a light guide plate shown in FIG. 1.

Referring to FIGS. 1, 2 and 3, a display apparatus 100 according to the present example embodiment includes a receiving container 110, a display panel 120 and a backlight assembly 200.

The receiving container 110 is disposed over the display panel 120, so that the receiving container 110 prevents the display panel from being damaged from an external impact. A window is formed through an upper surface of the receiving container 110 to expose a display area of the display panel 120 to the outside of the display apparatus.

The display panel 120 includes a thin film transistor substrate 122, a color filter substrate 124 and a liquid crystal layer (not shown). The thin film transistor substrate 122 includes a first base substrate, a thin film transistor and a pixel electrode (not shown). The color filter substrate 124 faces the thin film transistor substrate, and includes a second base substrate, a color filter and a common electrode (not shown). The liquid crystal layer is disposed between the thin film transistor substrate 122 and the color filter substrate 124, and a liquid crystal is aligned according to an electronic field formed between the pixel electrode of the thin film transistor substrate 122 and the common electrode of the color filter substrate 124. The display panel 120 displays an image using the light provided from a light exiting surface 224 of a light guide plate 220 included in the backlight assembly 200.

The backlight assembly 200 is disposed under the display panel 120, and provides the display panel 120 with light.

The backlight assembly 200 includes a light emitting portion 210, the light guide plate 220, a chromaticity converter 260 (shown in FIGS. 2 and 3), optical sheets 230, a reflecting sheet 240 and a bottom receiving container 250.

The light emitting portion 210 includes a printed circuit board 212 and a light emitting package 214, and emits light, referred to herein as first light L1. The light emitting portion 210 may be disposed to face at least one side surface of the light guide plate 220. For example, the light emitting portion 210 may be disposed to face one side surface of the light guide plate 220 corresponding to a direction substantially parallel with a relatively longer side of the display panel 120. Alternatively, the light emitting portion 210 may be disposed to face one side surface of the light guide plate 220 corresponding to a direction substantially parallel with a relatively shorter side of the display panel 120.

A plurality of signal lines are formed on the printed circuit board 212 to provide the light emitting package 214 with a driving voltage. For example, the printed circuit board 212 may be a metal core printed circuit board (MCPCB) through which any heat generated is efficiently dissipated.

The light emitting package 214 is mounted on the printed circuit board 212, and includes a light emitting chip 215, a lead frame 216 and a fluorescent portion 217 (FIG. 3). The light emitting chip 215 is disposed on the lead frame 216, and provides light which is referred to herein as second light L2. Second light L2 provided by the light emitting chip 215 is also a component of first light L1 emitted from the light emitting package 214. The light emitting chip 215 may be, for example, a light emitting diode (LED). The lead frame 216 is mounted on the printed circuit board 212, receives the driving voltage from the printed circuit board 212 and applies the driving voltage to the light emitting chip 215. The fluorescent portion 217 covers the light emitting chip 215, and emits the first light L1, which includes second light L2.

In one example, when the light emitting package 214 may emit a white light, the light emitting chip 215 may emit a blue light as second light L2, and the fluorescent portion 217 may include a yellow fluorescent material. In another example, the first light L1 may be the white light, the second light L2 may be the blue light, and the fluorescent portion 217 may include a fluorescent material in which red and green colors are mixed. In yet another example, the light emitting chip 215 may emit a red light as second light L2 and the fluorescent portion 217 may include a fluorescent material in which blue and green colors are mixed, so that the light emitting package 214 my emit the white light.

The lead frame 216 is long enough so that a plurality of the light emitting chips may be disposed on the lead frame 216. For example, when the light emitting chip 215 has a first length d1, a second length d2 of a surface of the lead frame 216 on which the light emitting chip 215 is disposed may be more than twice as long as the first length d1.

When the second length d2 of the surface of the lead frame 216 on which the light emitting chip 215 is disposed is more than twice as long as the first length d1 of the light emitting chip 215, the light emitting package 214 may emit the first light L1 having chromaticity which is varies depending on the area of the light emitting package 214 from which the light is emitted. For example, the light emitting package 214 emits the white light having a normal chromaticity in a first area 301 adjacent to the light emitting chip 215, but the light emitting package 214 emits the white light having a decreased chromaticity compared to the normal chromaticity in a second area 302 which is relatively far from the light emitting chip 215 as compared to the first area 301. For instance, when the light emitting chip 215 emits blue light and the fluorescent portion 217 includes a fluorescent material of mixed red and green colors, the light emitting package 214 emits the white light having the normal chromaticity in the first area 301 and emits the white light tinged with yellow in the second area 302.

The chromaticity converter 260 is disposed between the light emitting portion 210 and the light guide plate 220. For example, the chromaticity converter 260 may be disposed on a light-incident surface 222 of the light guide plate 220. The chromaticity converter 260 converts a chromaticity of the first light L1 provided from the light emitting package 214, so that a uniform light LU having a uniform chromaticity is provided to the light guide plate 220.

The chromaticity converter 260 is disposed along the light-incident surface 222 in a position corresponding to the first area 301, and decreases the chromaticity of light that enters into the light guide plate 220 through the first area 301. For example, the chromaticity converter 260 controls the chromaticity of light entering into the light guide plate 220 through the first area 301 so that the chromaticity of the light entering into the light guide plate 220 through the first area 301 may be substantially the same as the chromaticity of the light entering into the light guide plate 220 through the second area 302. Accordingly, the chromaticity converter 260 uniformly controls the chromaticity of the first light L1 provided from the light emitting package 214. Thus, the first light L1 having a uniform chromaticity, which is uniform light LU, may be provided to the light guide plate 220.

The chromaticity converter 260 also decreases the chromaticity of the second light L2 provided from the light emitting chip 215 through the fluorescent portion 217 so that the chromaticity of the first light L1 (which includes second light L2 as a component) incident into the light guide plate through the first area 301 may be decreased. For example, the chromaticity converter 260 includes a chromaticity converting material that decreases the chromaticity of the second light L2 provided from the light emitting chip 215 through the fluorescent portion 217. The chromaticity of the second light L2 provided from the light emitting chip 215 through the fluorescent portion 217 decreases as the distance from a center of the light emitting chip 215 increases along a direction parallel with the light-incident surface 222. Accordingly, a concentration of the chromaticity converting material of the chromaticity converter 260 is increased toward the center of the position of light emitting chip 215. Thus, a uniformity of the chromaticity uniform light LU incident into the light guide plate 220 may be enhanced.

The chromaticity converter 260 may include at least one of a fluorescent material, a resin and an inorganic ceramic material as the chromaticity converting material.

For example, when the light emitting chip 215 emits a blue light and the fluorescent portion 217 includes a yellow fluorescent material, the chromaticity converter 260 may include the yellow fluorescent material absorbing a chromaticity of the blue light. For example, such a chromaticity converter 260 may include red and green fluorescent materials. Alternatively, for example, the chromaticity converter 260 may include a titanium dioxide ($TiO_2$) material absorbing the chromaticity of the blue light.

The light guide plate 220 is disposed at one side of the light emitting portion 210, and receives the chromaticity uniform light LU generated from the light emitting portion 210 and passing through the chromaticity converter 260 through the incident surface 222 of the light guide plate 220, so that the chromaticity uniform light LU is guided and is emitted to the display panel 120 through the light exiting surface 224.

The optical sheets 230 are disposed over the light guide plate 220, and increase the light efficiency of the light emitted from the light guide plate 220. The optical sheets 230 may include, for example, a diffusion sheet, a prism sheet, a condensing sheet, and so on.

The reflecting sheet 240 is disposed between a bottom side of the light guide plate 220 and the bottom receiving container 250. The reflecting sheet 240 is also disposed between a bottom edge of the light emitting portion 210 and the bottom receiving container 250, so that the reflecting sheet 240 reflects leaked light of the first light L1 which is not provided directly to the light guide plate 220.

The bottom receiving container 250 and the upper receiving container 110 are combined with each other, and receive the reflecting sheet 240, the light guide plate 220, the chromaticity converter 260, the light emitting portion 210, the optical sheets 230 and the display panel 120.

The display apparatus 100 may further include a mold frame 130. The mold frame 130 is disposed between the display panel 120 and the optical sheets 230, so that the mold frame 130 supports the display panel 120 and fixes the light guide plate 220, the chromaticity converter 260, the optical sheets 230 and the reflecting sheet 240 to the bottom receiving container 250.

Figure 4:
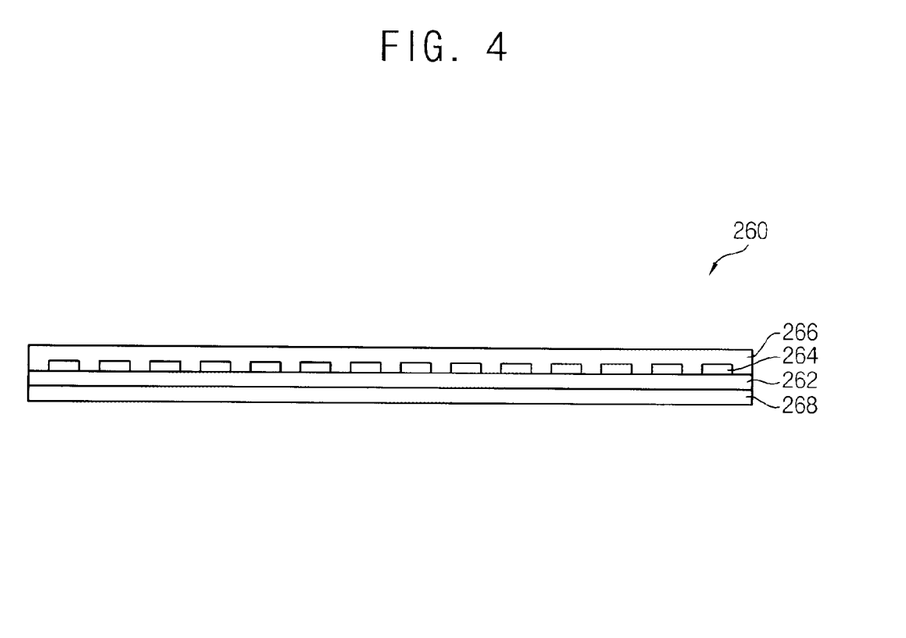
FIG. 4 is a cross-sectional view illustrating the chromaticity converter shown in FIGS. 2 and 3.

FIG. 4 is a cross-sectional view illustrating the chromaticity converter shown in FIGS. 2 and 3.

Referring to FIG. 4, the chromaticity converter 260 includes a base film 262, a chromaticity converting material 264, a protecting layer 266 and an adhesion layer 268.

The chromaticity converting material 264 converts the chromaticity of the first light L1 by decreasing the chromaticity of the second light L2 included as a component of first light L1, and is disposed on a first surface of the base film 262. The chromaticity converting material 264 may be mixed with a resin paste to have a viscosity. The protecting layer 266 covers the chromaticity converting material 264, so that the protecting layer 266 prevents the chromaticity converting material 264 from being damaged. The adhesion layer 268 is disposed on a second surface of the base film 262 opposite to the first surface of the base film 262. A first surface of the adhesion layer 268 makes contact with the second surface of the base film 262, and a second surface of the adhesion layer 268 opposite to the first surface of the adhesion layer 268 makes contact with the incident surface 222 of the light guide plate 220.

FIG. 5A to FIG. 5F are cross-sectional views illustrating a method of manufacturing a backlight assembly shown in FIGS. 1 and 2.

Figure 5A:
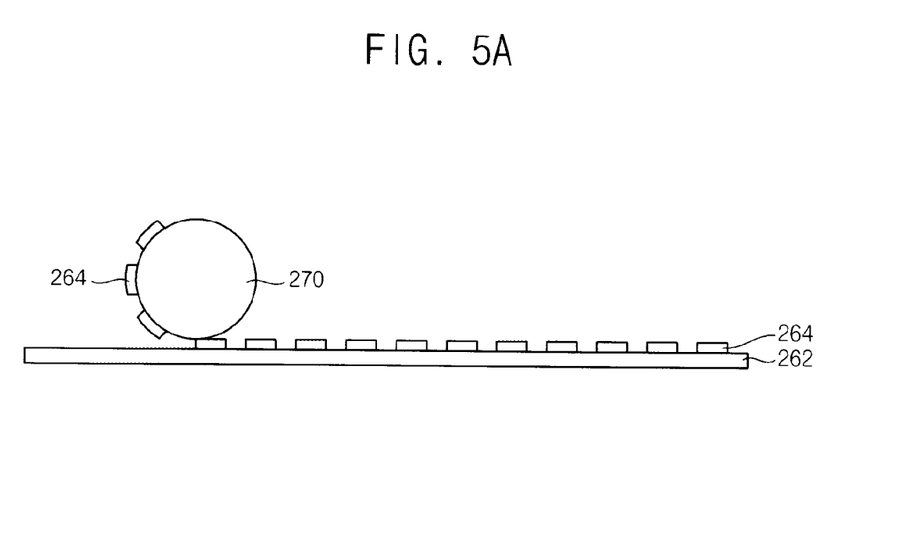

Referring to FIG. 5A, the chromaticity converting material 264 is formed on the first surface of the base film 262. A concentration of the chromaticity converting material 264 may be increased closer to the center of the position over the light emitting chip 215. The chromaticity converting material 264 is transferred to the first surface of the base film 262 from a surface of a roller 270, so that the chromaticity converting material 264 may be formed on the surface of the base film 262.

Figure 5B:
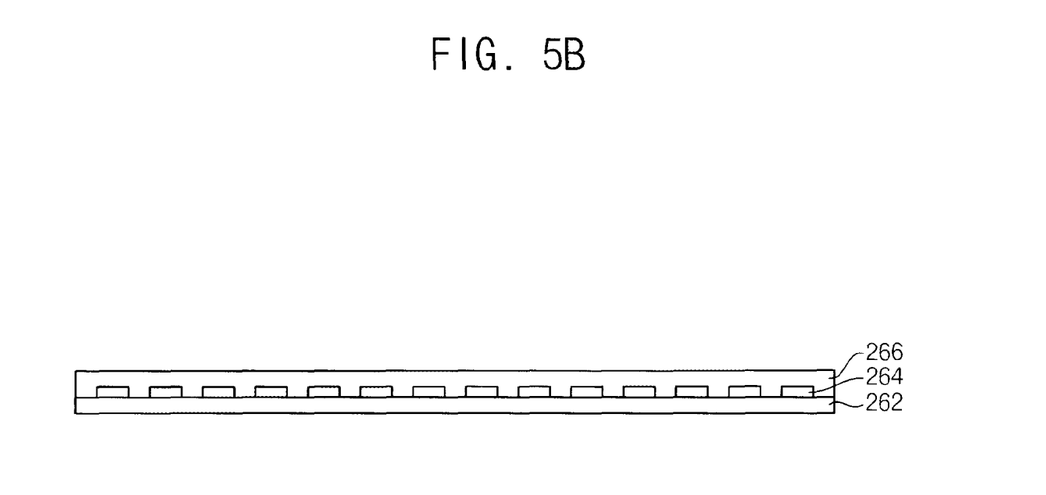

Referring to FIG. 5B, the protecting layer 266 is formed on the chromaticity converting material 264 to cover the chromaticity converting material 264. The protecting layer 266 may be formed using an acrylic acid resin, for example which is UV cured, a polyester resin, or a polycarbonate resin, and so on.

Figure 5C:
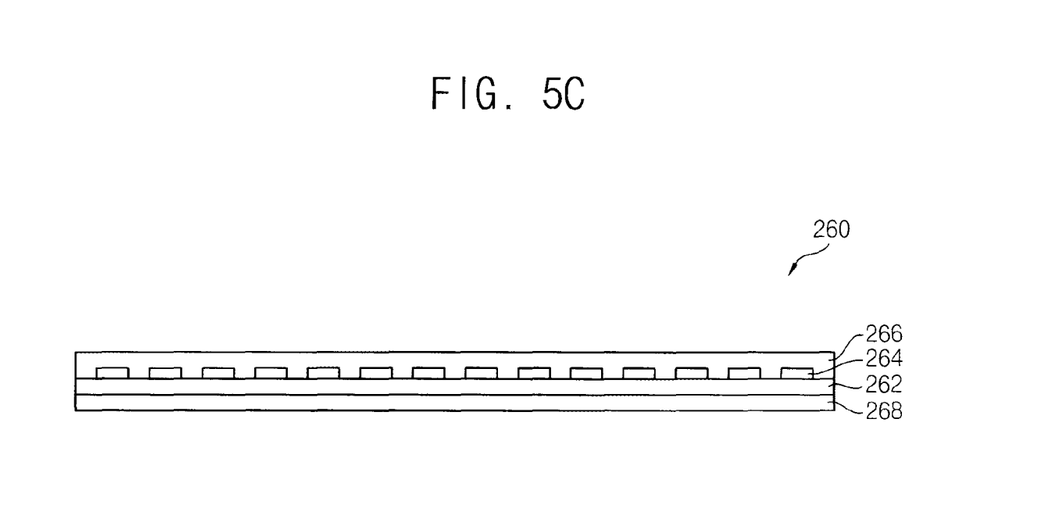

Referring to FIG. 5C, the adhesion layer 268 is formed on the second surface of the base film 262, so that the chromaticity converter 260 is formed. The adhesion layer 268 may be formed using an acrylic acid resin, an epoxy resin or a polyester resin, and so on.

Figure 5D:
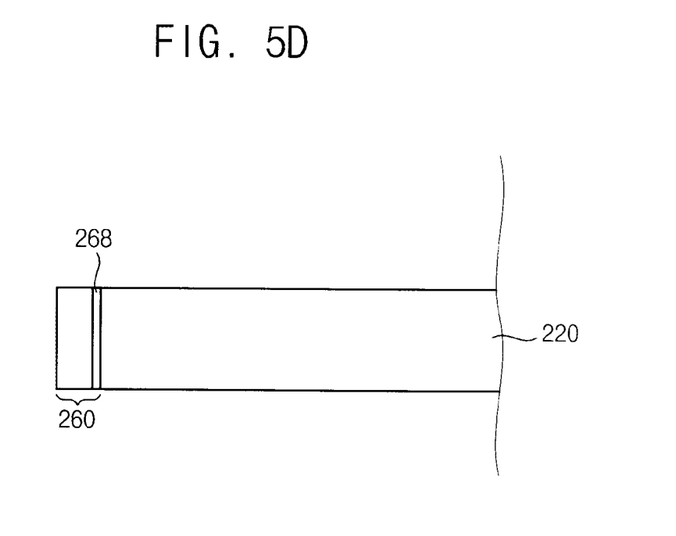

Referring to FIG. 5D, the adhesion layer 268 of the chromaticity converter 260 is attached on the light guide plate 220, and thus the chromaticity converter 260 is attached on the light guide plate 220. Accordingly, the chromaticity converter 260 is formed as a tape, and is attached on the light guide plate 220.

Figure 5E:
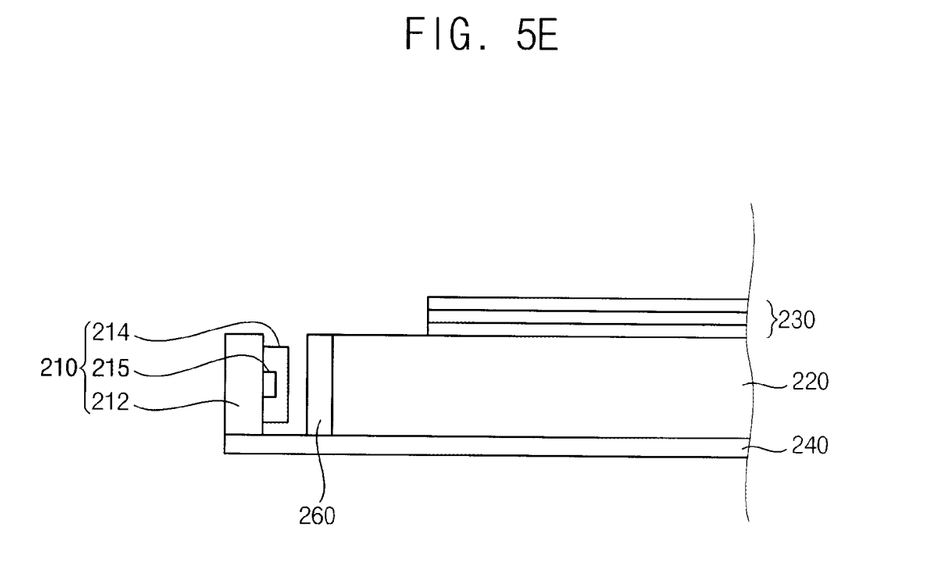

Referring to FIG. 5E, the light emitting portion 210 is disposed to face the chromaticity converter 260, the reflecting sheet 240 is disposed under the light emitting portion 210 and the light guide plate 220, and the optical sheets 230 are disposed on the light guide plate 220.

Figure 5F:
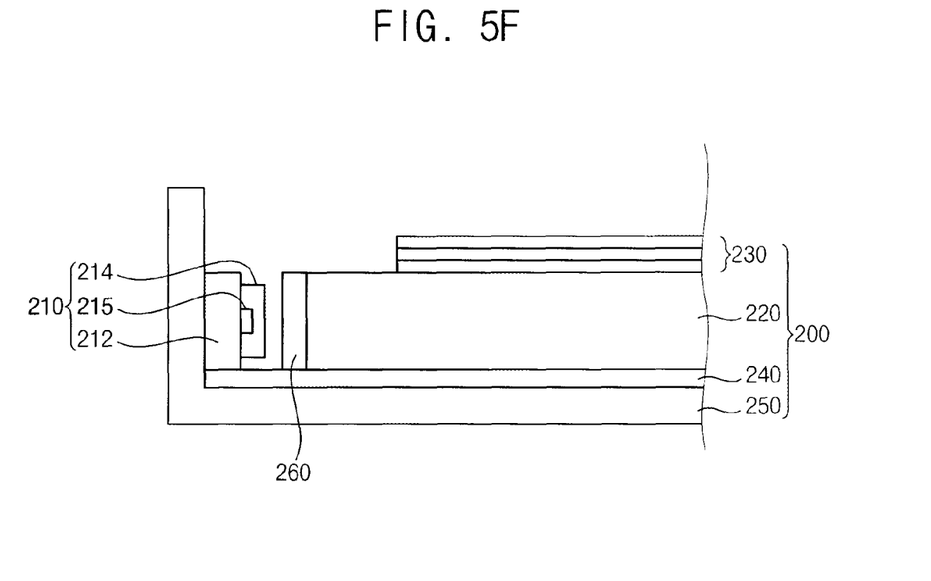

Referring to FIG. 5F, the receiving container 250 receives the light emitting portion 210, the light guide plate 220, the chromaticity converter 260, the optical sheets 230 and the reflecting sheet 240.

According to the present example embodiment, the chromaticity converter 260 converts the first light L1 provided from the light emitting portion 210 and having chromaticity that varies depending on the area, and controls uniformly the first light L1, so that a uniform light LU having a uniform chromaticity may be incident into the light guide plate 220.

Figure 6:
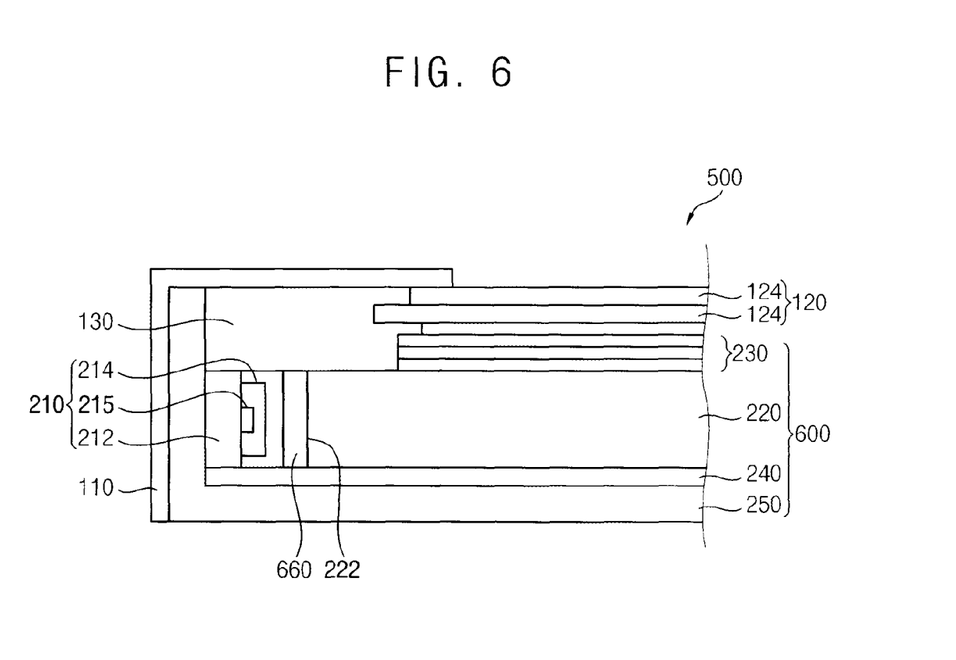
FIG. 6 is a cross-sectional view illustrating a backlight assembly according to another example embodiment.

FIG. 6 is a cross-sectional view illustrating a backlight assembly according to another example embodiment.

A display apparatus 500 according to the present example embodiment is substantially same as the display apparatus 100 of FIG. 2, except for a chromaticity converter 660 of a backlight assembly 600. Accordingly, the same reference numerals will be used to refer to the same or like parts as those described in FIG. 2, and duplicative explanation concerning such parts will be omitted.

Referring to FIG. 6, the display apparatus 500 according to the present example embodiment includes an upper receiving container 110, a display panel 120 and a backlight assembly 600.

The backlight assembly 600 includes a light emitting portion 210, a light guide plate 220, a chromaticity converter 660, optical sheets 230, a reflecting sheet 240 and a bottom receiving container 250.

The chromaticity converter 660 is disposed between the light emitting portion 210 and the light guide plate 220. For example, the chromaticity converter 660 may be disposed on the incident surface 222 of the light guide plate 220.

The chromaticity converter 660 includes a chromaticity converting material decreasing a chromaticity of a light provided from the light emitting portion 210, and may be mixed with a resin paste to have a particular viscosity. As compared to the chromaticity converter 260 shown in FIG. 3, the chromaticity converter 660 does not include the base film 262, the protecting layer 266 and the adhesion layer 268.

A function of the chromaticity converter 660 according to the present example embodiment is substantially same as that of the chromaticity converter 260 explained with reference to FIGS. 2 and 3. Accordingly, duplicative explanation concerning the same or like parts will be omitted.

Figure 7A:
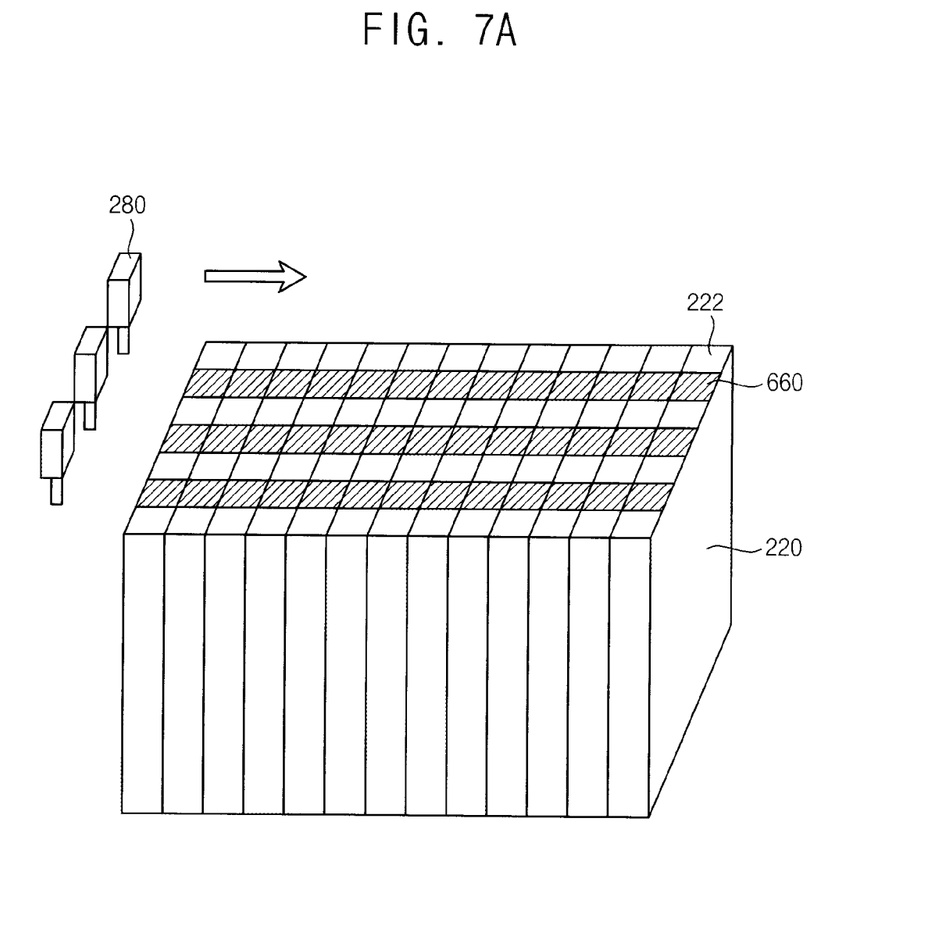
FIGS. 7A and 7B are perspective views illustrating a method of forming the chromaticity converter shown in FIG. 6 on a light guide plate.
Figure 7B:
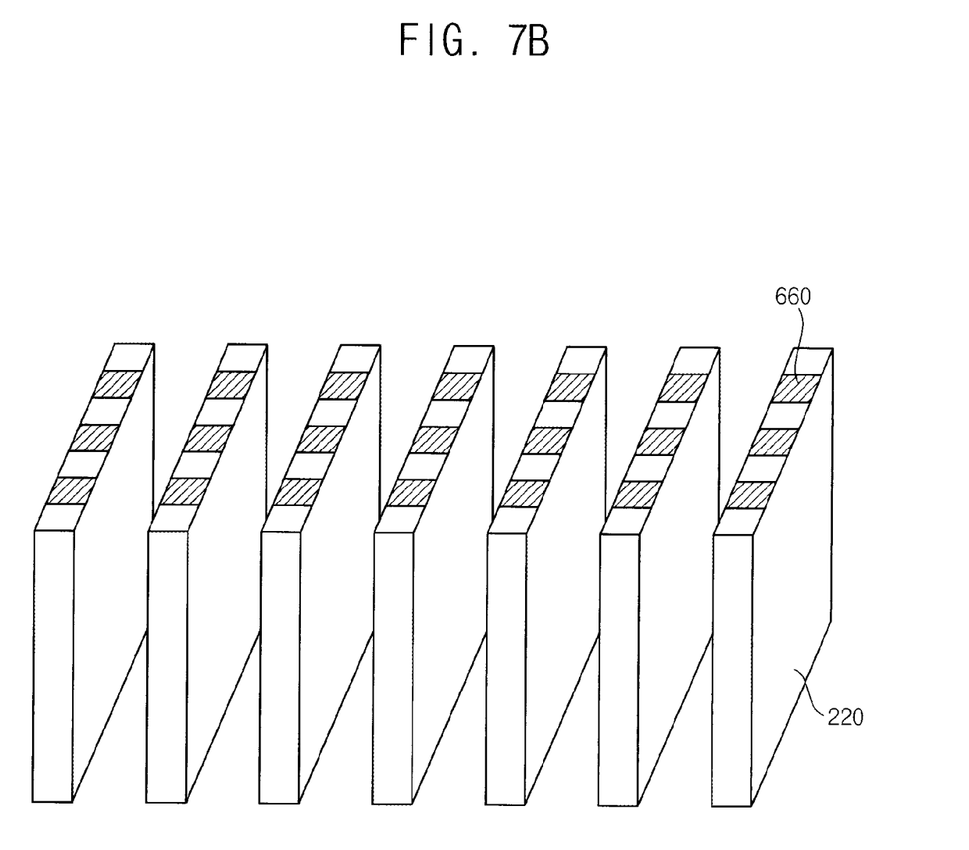

FIGS. 7A and 7B are perspective views illustrating a method of forming the chromaticity converter shown in FIG. 6 on a light guide plate.

Referring to FIG. 7A, the chromaticity converter 660 is formed on the incident surface 222 of the light guide plate 220. FIG. 7A shows manufacturing process that includes a number of the light guide plates 220. The light guide plates 220 are stacked so as to face the same direction, and the chromaticity converter 660 is formed on the incident surface 222 of each light guide plate via a spray method using a spreading unit 280. Spreading unit 280 deposits the chromaticity converter material directly onto the incident surfaces 222 of each of the light guide plates. For example, the chromaticity converter material decreases a chromaticity of a light provided from the light emitting portion 210, and may be mixed with a resin paste to have a particular viscosity.

Referring to FIG. 7B, the light guide plates 220 are then separated from each other, and thus the chromaticity converter 660 is formed on each of the light guide plates 220.

A method of manufacturing the backlight assembly 600 according to the present example embodiment includes forming the chromaticity converter 660 on the light guide plate 220, as explained with reference to FIGS. 7A and 7B.

Then, as explained with reference to FIGS. 5E and 5F, the light emitting portion 210 is disposed to face the chromaticity converter 660, the reflecting sheet 240 is disposed under the light emitting portion 210 and the light guide plate 220, and the bottom receiving container 250 receives the light emitting portion 210, the light guide plate 220, the chromaticity converter 660, the optical sheet 230 and the reflecting sheet 240.

According to the present example embodiment, the chromaticity converter 660 is formed on a plurality of the light guide plates 220 via the spray method, so that an efficiency of a manufacturing process may be enhanced.

Figure 8:
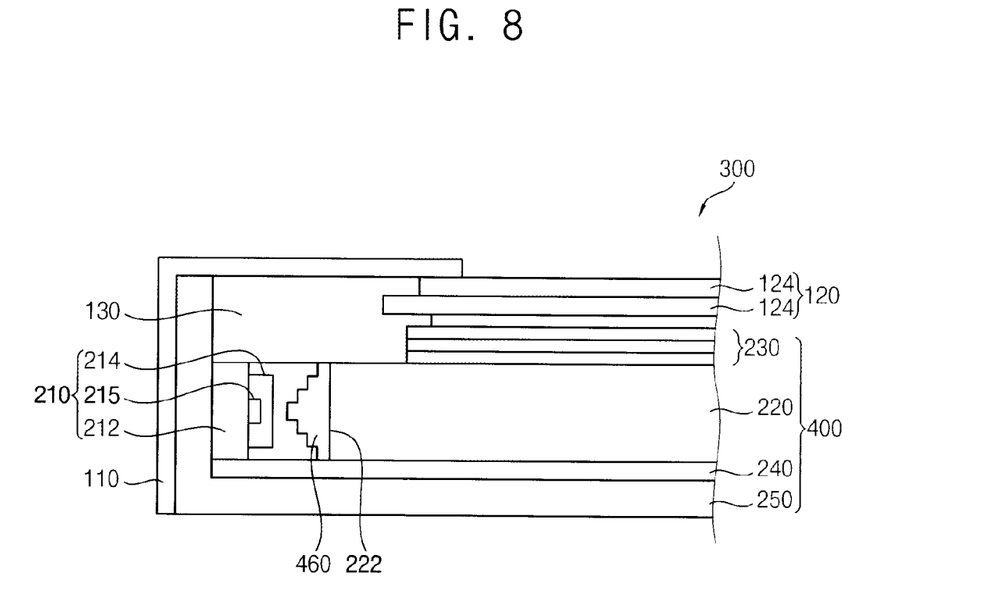
FIG. 8 is a cross-sectional view illustrating a backlight assembly according to still another example embodiment.
Figure 9:
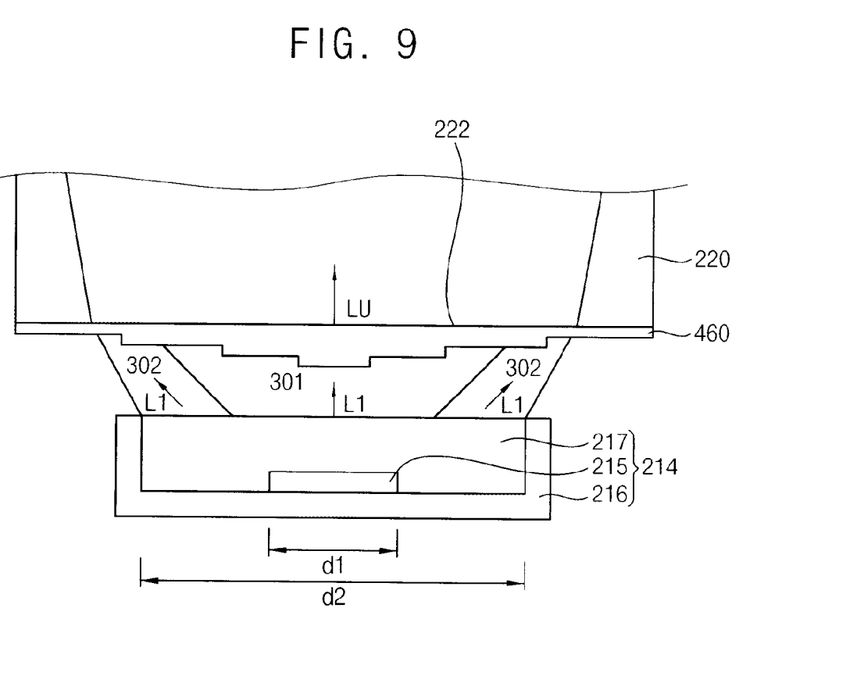
FIG. 9 is a plan view illustrating a light emitting package, a chromaticity converter and a light guide plate shown in FIG. 8.

FIG. 8 is a cross-sectional view illustrating a backlight assembly according to still another example embodiment. FIG. 9 is a plan view illustrating a light emitting package, a chromaticity converter and a light guide plate shown in FIG. 8.

A display apparatus 300 according to the present example embodiment is substantially same as the display apparatus 100 shown in FIGS. 2 and 3, except for a chromaticity converter 460 of backlight assembly 400. Accordingly, the same reference numerals will be used to refer to the same or like parts as those described in FIGS. 2 and 3, and duplicative explanation concerning the same or like parts will be omitted.

Referring to FIGS. 8 and 9, the display apparatus 300 includes an upper receiving container 110, display panel 120 and a backlight assembly 400.

The backlight assembly 400 includes a light emitting portion 210, a light guide plate 220, a chromaticity converter 460, optical sheets 230, a reflecting sheet 240 and a bottom receiving container 250.

The chromaticity converter 460 is disposed between the light emitting portion 210 and the light guide plate 220. For example, the chromaticity converter 460 may be disposed on the incident surface 222 of the light guide plate 220. The chromaticity converter 460 converts a chromaticity of the first light L1 provided from the light emitting package 214, so that a uniform light LU having a uniform chromaticity is provided.

The chromaticity of the second light L2 provided from the light emitting chip 215 through the fluorescent portion 217 is decreased as the distance from the center of the light emitting chip 215 increases along a direction parallel to the light-incident surface 222. Accordingly, the chromaticity converter 460 may be formed such that the first area 301 of the chromaticity converter 460 which is closer to the center of the light emitting chip 215, is thicker than the second area 302 of the chromaticity converter 460 which is farther from the center of the light emitting chip 215. Thus, a thickness of the chromaticity converter 460 is increased toward the center of the light emitting chip 215. For example, the chromaticity converter 460 may be formed as a stepped shape, and a thickness of the stepped shape is increased toward the center of the light emitting chip 215. Alternatively, the chromaticity converter 460 may be formed as a triangular shape, and a thickness of the triangular shape is increased toward the center of the light emitting chip 215. Alternatively, the chromaticity converter 460 may be formed as a hemispheric shape, and a thickness of the hemispheric shape is increased toward the center of the light emitting chip 215. Accordingly, the chromaticity converter 460 decreases a chromaticity of a light incident into the light guide plate 220 through the first area 301 much more than that of a light incident into the light guide plate 220 through the second area 302, of the first light L1 provided from the light emitting package 214.

For example, the chromaticity converter 460 decreases the chromaticity of the first light L1 in the first area 301 much more, as the first light L1 in the first area 301 is provided from the center of the light emitting chip 215. Accordingly, the chromaticity converter 460 controls uniformly the chromaticity of the first light L1 provided from the light emitting package 214, so that the uniform light LU having a uniform chromaticity of the first light L1 may be provided to the light guide plate 220.

The chromaticity converter 460 also decreases the chromaticity of the second light L2 provided from the light emitting chip 215 through the fluorescent portion 217 to decrease the chromaticity of the first light L1 provided from the center of the light emitting chip 215 much more. For example, the chromaticity converter 460 includes a chromaticity converting material decreasing the chromaticity of the second light L2 provided from the light emitting chip 215 through the fluorescent portion 217. A concentration of the chromaticity converting material included in the chromaticity converter 460 is uniform. The thickness of the chromaticity converter 460 is increased toward the center of the light emitting chip 215. Accordingly, the uniform light LU incident into the light guide plate 220 may be uniform.

The chromaticity converter 460 may include at least one of a fluorescent material, a resin, and an inorganic ceramic material as the chromaticity converting material.

In one example, when the light emitting chip 215 emits a blue light and the fluorescent portion 217 includes a yellow fluorescent material, the chromaticity converter 460 may include a yellow fluorescent material that decreases a chromaticity of the blue light. In another example, the chromaticity converter 460 may include red and green fluorescent materials. In yet another example, the chromaticity converter 460 may include an epoxy resin that decreases a chromaticity of the blue light. Alternatively, the chromaticity converter 460 may include a titanium dioxide ($TiO_2$) that decreases a chromaticity of the blue light.

A method of manufacturing the backlight assembly 400 shown in FIGS. 8 and 9 according to the present example embodiment includes forming the chromaticity converter 460 on the incident surface 222 of the light guide plate 220. For example, a thickness of the chromaticity converter 460 is increased toward the center of the light emitting chip 215. For example, the chromaticity converter 460 may be formed on the incident surface 222 via the spray method as explained in FIGS. 7A and 7B.

Then, as explained with reference to FIGS. 5E and 5F, the light emitting portion 210 is disposed to face the chromaticity converter 460, the reflecting sheet 240 is disposed under the light emitting portion 210 and the light guide plate 220, and the bottom receiving container 250 receives the light emitting portion 210, the light guide plate 220, the chromaticity converter 460, the optical sheet 230 and the reflecting sheet 240.

According to the present example embodiment, the thickness of the chromaticity converter 460 is increased toward the center of the light emitting chip 215. Accordingly, the chromaticity of the first light L1 provided from the light emitting package 214 is decreased much more toward the center of the light emitting chip 215. Thus, the uniform light LU having a uniform chromaticity of the first light L1 may be applied to the light guide plate 220.

According to the example embodiments, even if the light having chromaticity that varies depending on position is generated from a light emitting portion, the chromaticity of the light generated from the light emitting portion is converted, so that the light having a uniform chromaticity may be applied to a light guide plate. Accordingly, a display quality of a display apparatus may be enhanced.

The foregoing is illustrative and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present invention. Therefore, it is to be understood that the foregoing is illustrative and is not to be construed as limited to the specific example embodiments disclosed, and that modifications to the disclosed example embodiments, as well as other example embodiments, are intended to be included within the scope of the disclosure

What is claimed is:

1. A backlight assembly comprising:
  a light emitting portion configured to generate a first light, the light emitting portion including a light emitting chip positioned in a center area of the light emitting portion;
  a chromaticity converter configured to receive the first light, and convert a chromaticity of the first light to generate a second light having a uniform chromaticity, the chromaticity converter positioned over the entire surface of the light emitting chip in a plan view; and
  a light guide plate including a planar incident surface into which the second light is incident and a light exiting surface through which the second light from the incident surface exits,
  wherein the chromaticity converter includes a planar surface facing the planar incident surface and an opposite surface parallel to the planar surface, and a first portion of the first light emitted from the center area of the light emitting portion is incident directly onto the opposite surface of the chromaticity converter and a second portion of the first light emitted from an area of the light emitting portion outside of the center area is incident directly onto the planar incident surface of the light guide plate.

2. The backlight assembly of claim 1, wherein the chromaticity converter is disposed on the incident surface of the light guide plate.

3. The backlight assembly of claim 1, wherein the light emitting chip generates a second light, and the light emitting portion further comprises:
   a lead frame on which the light emitting chip is mounted; and
   a fluorescent portion covering the light emitting chip and mixed with the second light from the light emitting chip to generate the first light.

4. The backlight assembly of claim 3, wherein the chromaticity converter comprises a chromaticity converting material decreasing a chromaticity of the second light, and a concentration of the chromaticity converting material increases toward a center of the light emitting chip.

5. The backlight assembly of claim 3, wherein a thickness of the chromaticity converter is increased toward a center of the light emitting chip.

6. The backlight assembly of claim 3, wherein the chromaticity converter decreases a chromaticity of the second light generated from the light emitting chip.

7. The backlight assembly of claim 3, wherein the first light is a white light, the second light is a blue light, and the fluorescent portion comprises red and green fluorescent materials.

8. The backlight assembly of claim 7, wherein the chromaticity converter comprises a yellow fluorescent material.

9. The backlight assembly of claim 7, wherein the chromaticity converter comprises red and green fluorescent materials.

10. The backlight assembly of claim 7, wherein the chromaticity converter comprises an epoxy resin.

11. The backlight assembly of claim 7, wherein the chromaticity converter comprises titanium dioxide ($TiO_2$).

12. The backlight assembly of claim 1, wherein the chromaticity converter comprises:
   a chromaticity converting material converting the chromaticity of the first light; and
   a resin paste mixed with the chromaticity converting material.

13. The backlight assembly of claim 1, wherein the chromaticity converter comprises:
   a base film;
   a chromaticity converting material disposed on a first surface of the base film, and converting the chromaticity of the first light;
   a protecting layer covering the chromaticity converting material to prevent the chromaticity converting material from being damaged; and
   an adhesion layer disposed on a second surface opposite to the first surface and attached to the incident surface of the light guide plate.

* * * * *